United States Patent
Pavlenko (10) Patent No.: US 8,833,951 B1
(45) Date of Patent: Sep. 16, 2014

(54) ASSEMBLE-FREE FAST DEPLOYABLE LIGHT MODIFIER

(76) Inventor: Olexandr Pavlenko, Shoreview, MN (US)

( * ) Notice: Subject to any disclaimer, the term of this patent is extended or adjusted under 35 U.S.C. 154(b) by 0 days.

(21) Appl. No.: 13/363,812

(22) Filed: Feb. 1, 2012

(51) Int. Cl.
  *G03B 15/02* (2006.01)
  *G03B 15/06* (2006.01)
  *A45B 13/00* (2006.01)
  *F21V 7/18* (2006.01)

(52) U.S. Cl.
  CPC .................................... *F21V 7/18* (2013.01)
  USPC ............ 362/16; 362/18; 362/3; 362/7; 396/4; 396/198; 396/200; 135/19.5; 135/98; 135/91; 135/135

(58) Field of Classification Search
  USPC ............ 362/3, 7, 10, 16–18; 396/4, 198, 200; 135/19.5, 90, 98, 99, 905, 33.2, 91, 135/135
  See application file for complete search history.

(56) References Cited

U.S. PATENT DOCUMENTS

| | | | |
|---|---|---|---|
| 685,968 A | 11/1901 | Brown | |
| 739,437 A | 9/1903 | McComb | |
| 923,542 A | 6/1909 | Losey | |
| 1,414,616 A * | 5/1922 | Beehler | 135/90 |
| 2,105,225 A | 1/1938 | Pollock | |
| 2,190,403 A | 2/1940 | Foute | |
| 2,205,860 A | 6/1940 | Phelps Olds | |
| 3,294,962 A | 12/1966 | Hilzen | |
| 3,778,132 A | 12/1973 | Pinnow et al. | |
| 3,781,535 A | 12/1973 | Larson | |
| 3,821,542 A | 6/1974 | Kitamura | |
| 3,851,164 A | 11/1974 | Intrator | |
| 3,873,821 A | 3/1975 | Larson | |
| 4,052,607 A | 10/1977 | Larson | |
| 4,075,472 A | 2/1978 | Higuchi | |
| 4,210,952 A | 7/1980 | Ressmeyer | |
| 4,446,506 A | 5/1984 | Larson | |
| 4,594,645 A | 6/1986 | Terashita | |
| 4,633,374 A | 12/1986 | Waltz | |
| 4,693,553 A | 9/1987 | Sasaki et al. | |
| 4,757,425 A | 7/1988 | Waltz | |
| 5,023,757 A | 6/1991 | Shirilla | |
| 5,331,524 A | 7/1994 | Tseng | |
| 5,974,273 A * | 10/1999 | Larkin et al. | 396/162 |
| 6,491,405 B1 * | 12/2002 | Shirilla | 362/16 |
| 2002/0075666 A1 * | 6/2002 | Shirilla et al. | 362/16 |
| 2002/0141172 A1 * | 10/2002 | Shirilla | 362/16 |
| 2005/0088836 A1 * | 4/2005 | Lowe | 362/18 |

* cited by examiner

*Primary Examiner* — Mariceli Santiago (57) ABSTRACT

An assemble-free fast deployable light modifier with a back side light source mount is an umbrella shaped light modifier providing an extremely soft diffusive light; with attached light diffusers, it uniquely easily and quickly opens from the vertex of its hemisphere to the inside of it, and folds in hands promptly; having optical fibers increases a number of light source sensor triggering. Any assembling or disassembling operations are not required. With the features mentioned above it is the fastest deployable light modifier.

9 Claims, 9 Drawing Sheets

ASSEMBLE-FREE FAST DEPLOYABLE LIGHT MODIFIER

CROSS-REFERENCE TO RELATED APPLICATIONS

| Pat. No. | Issue date | Original Assignee |
|---|---|---|
| 685968 | Nov. 5, 1901 | Brown |
| 739437 | Sep. 22, 1903 | McComb |
| 923542 | Jun. 1, 1909 | Losey |
| 2105225 | Jan. 11, 1938 | Pollock |
| 2190403 | Feb. 13, 1940 | Foute |
| 2205860 | Jun. 25, 1940 | Phelps Olds |
| 3294962 | Dec. 27, 1966 | Hilzen |
| 3781535 | 1973 | Raymond George Larson |
| 3821542 | Jun. 2, 1974 | Masaharu Kitamura |
| 3851164 | 1974 | Charles Intrator |
| 3873821 | Mar. 2, 1975 | Raymond George Larson |
| 4052607 | Oct. 4, 1977 | Raymond George Larson |
| 4075472 | Feb. 21, 1978 | Masaru Higuchi |
| 4210952 | Jul. 1, 1980 | Roger H. Ressmeyer |
| 4446506 | May. 1, 1984 | Raymond G. Larson |
| 4594645 | Jun. 10, 1986 | Yutake Terashita |
| 4633374 | Dec. 30, 1986 | Thomas A. Waltz |
| 4757425 | Jul. 12, 1988 | Thomas A. Waltz |
| 5023757 | Jun. 11, 1991 | John Shirilla |
| 5331524 | Jul. 19, 1994 | Chuen-Jong Tseng |
| 4693553 | Sep. 15, 1987 | Isao Sasaki, Kozi Nishida, Masaru Morimoto, Takashi Yamamoto |
| 3778132 | 1973 | Douglas Arthur Pinnow, Douglas Arthur Pinno |

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

This application relates to photographic foldable light modifiers, specifically to an improved method of operating of a foldable light modifier.

The photographic foldable light modifiers of umbrella type as well as soft boxes are widely used by photographers to control the quality of light.

There are two major types of photographic umbrellas: reflective umbrella and shoot-through umbrella. Though both types of photographic umbrellas are easy to open, there are two major disadvantages:
1. In a reflective umbrella a light source has to be mounted at the front side of umbrella, which limits convenience of a manual control of a light source, and in many cases, wherein photo camera is located behind of reflective umbrella, triggering from camera's flash could be missed.
2. In a shoot-through umbrella direct light diffusing through a hemispherical white fabric spreads around more widely, which is not acceptable in many light scenarios.

Soft boxes solve the disadvantages of photographic umbrellas listed above and having two diffusers, produce much softer light, but require time-consuming assembling and disassembling operations, including attaching and detaching of light diffusers. Also, when using soft boxes in outdoor photography, assembling and disassembling processes may become problematic in outdoor conditions, as often it is done on the ground, which may result scratches and damages of soft box.

BRIEF SUMMARY OF THE INVENTION

An assemble-free fast deployable light modifier solves the functional disadvantages listed above. With attached light diffusers it easily opens and folds in hands promptly, and it produces the ultimately soft quality light, and it provides good convenient control of the light source, mounted on the back side, and it increases reliability of light source triggering from a camera's flash.

DETAILED DESCRIPTION OF THE INVENTION

Figure 1:
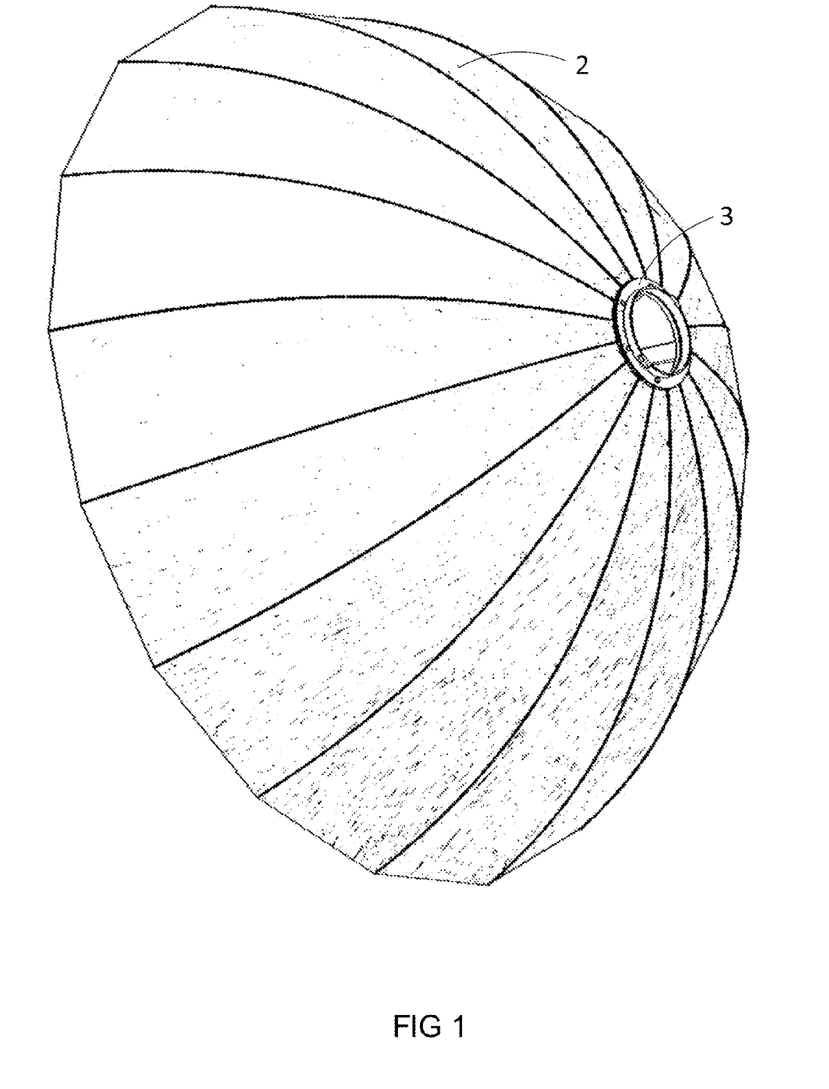
FIG. 1 illustrates a back side view of the assemble-free fast deployable light modifier in its operational state.
Figure 2:
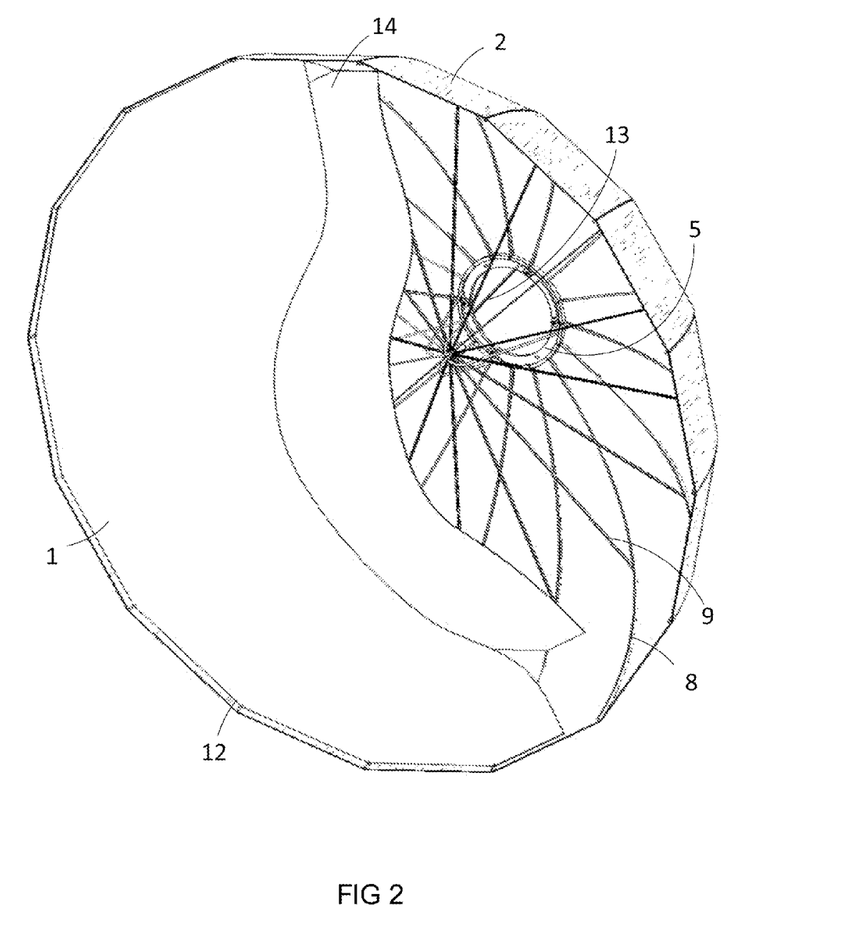
FIG. 2 illustrates an inner view of the assemble-free fast deployable light modifier in its operational state, with a partial view of layers of interweaving threads.

The assemble-free fast deployable light modifier comprising a structure of pivotably connected ribs means for collapsing, stretched over by sewed together fabric sections, or sectional material (2) having a dark side means for light absorbing, FIG. 1, and a bright side means for light reflection, and a front white material, or fabric, or layer of interweaving threads (1) means for light diffusing, FIG. 2.

Figure 3:
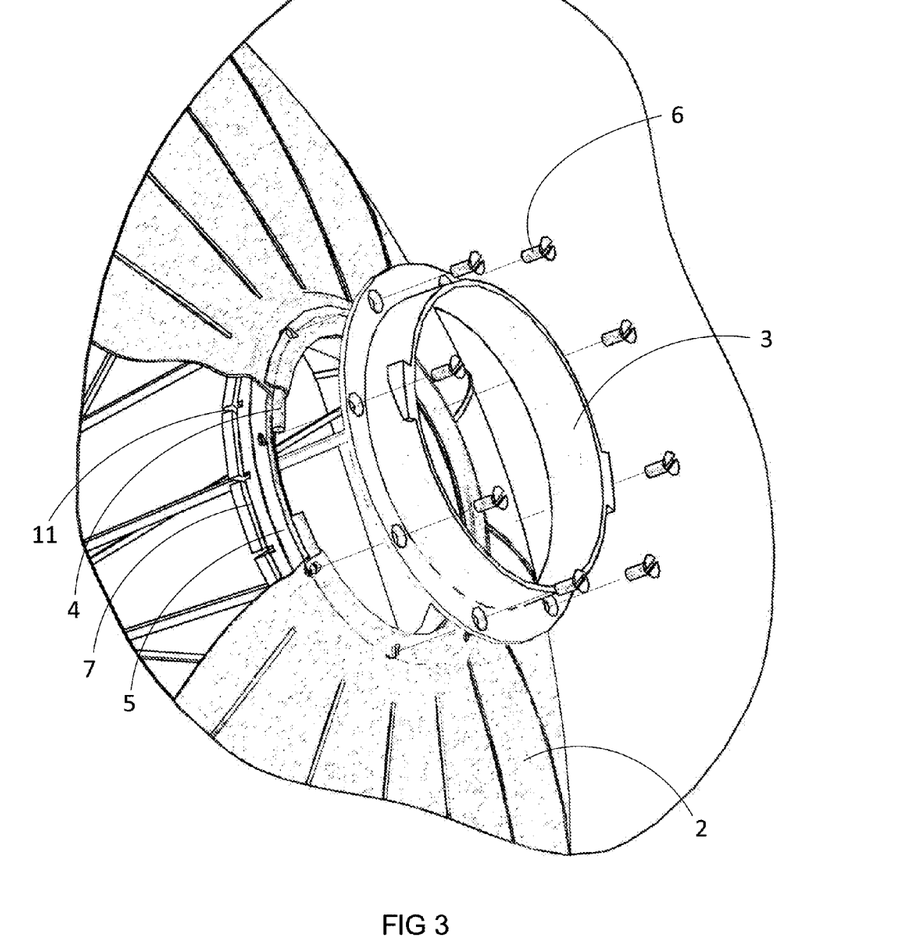
FIG. 3 illustrates a sectional material wrapped around a cord, and a method of clamping sectional material between the base ring and a speed ring.
Figure 7:
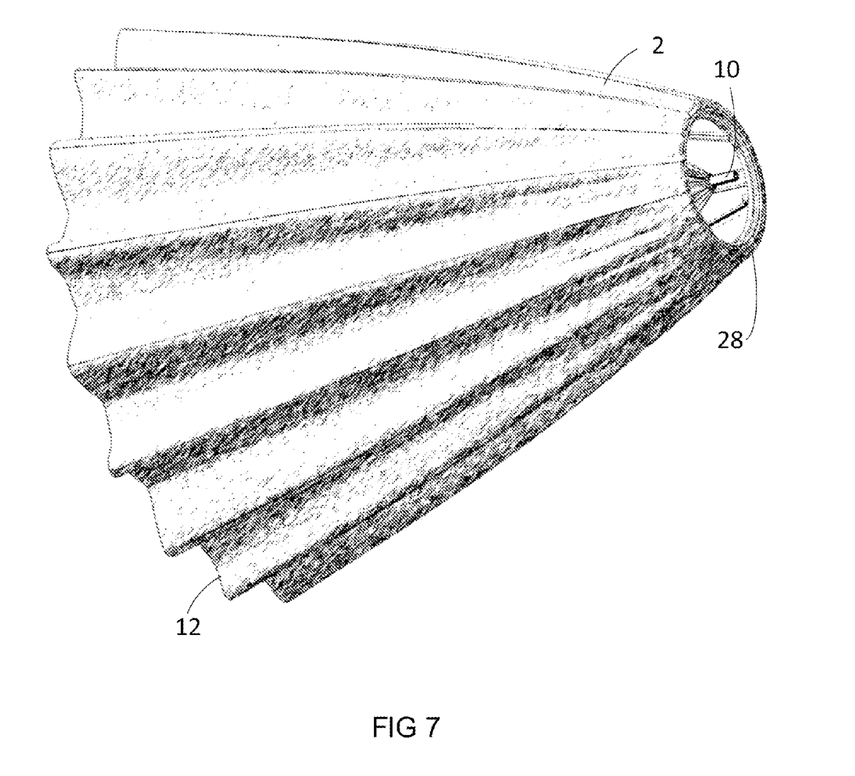
FIG. 7 illustrates a side view of the assemble-free fast deployable light modifier in the semi-collapsed stage.

The sectional material (2) has a sectional pattern with trapezoid shaped pieces sawn together. The sectional material (2) attached to outer ribs (8) along seams. Hereby sawn pieces of said sectional material form dome shape, FIG. 2, said sectional material comprising a front edge (12) and a back edge (28), FIG. 7. At said back edge the sectional material (2) is wrapped around a cord or wire (4), secured with a seam, and clamped between a base ring (5) and a speed ring (3) with bolts (6), FIG. 3.

The structure comprises a plurality of outer ribs (8), pivotably connected means for hinging, to the base ring (5) and to inner ribs (9), FIG. 2.

First end of each outer rib (8) is inserted into equally spaced slots (11) of the base ring (5) and secured by a wire (not shown). The wire passes through holes (not shown) disposed at the first end of outer ribs (8) and inside of a gutter (7), and wraps around the base ring (5), FIG. 2A.

Second ends of outer ribs (8) spaced with a predetermined distance and attached to the front edge (12) of the sectional material (2), and are holding the layer of interweaving threads (1) tightly, FIG. 2.

Figure 2A:
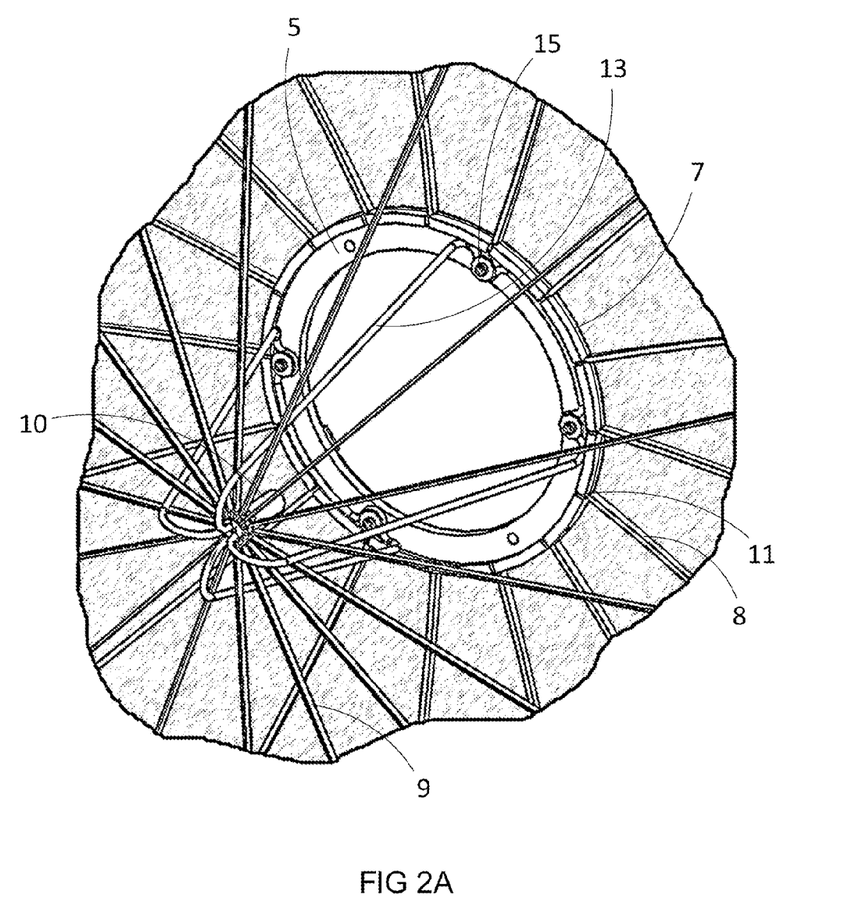
FIG. 2A illustrates a close view of a pyramidal shaped supportive frame comprising supportive ribs joined in a pyramidal form and a base ring.
Figure 5:
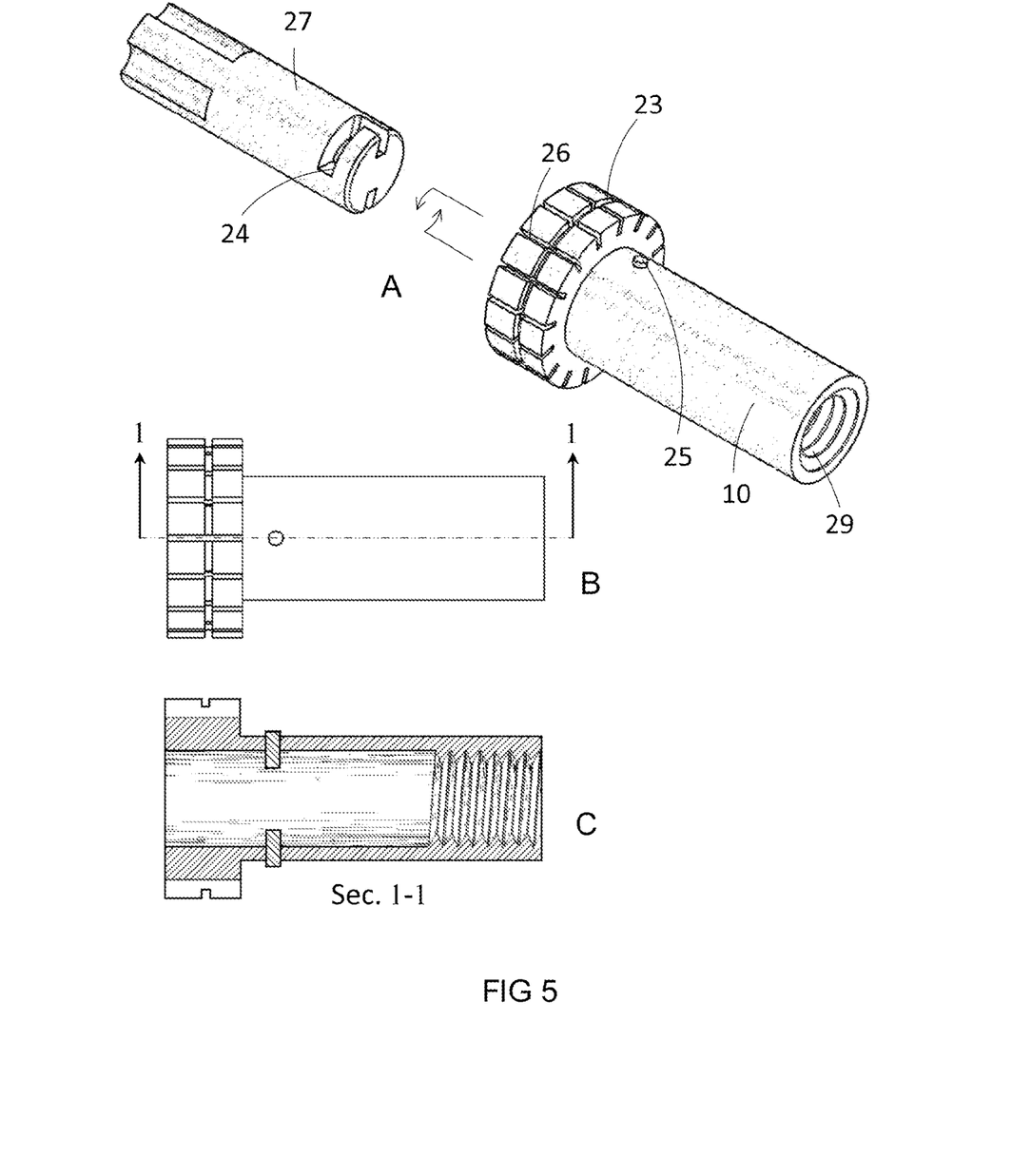
FIG. 5 illustrates a detailed view of the first member of the bayonet locker and the second member of the bayonet locker, and a sectional view of the first member of the bayonet locker.

First ends of inner ribs (9), with a predetermined backlash, are pivotably attached to outer ribs (8) at about the middle of them, FIG. 2. A first member (10) comprises equally spaced slots (26) and a gutter (23), FIG. 5. Second ends of inner ribs (9), FIG. 2A, are inserted into equally spaced slots (26), FIG. 5, of a first member (10) and secured with backlash by a wire (not shown), FIG. 2A. Inside of a gutter (23), FIG. 5, a wire passes through holes (not shown) disposed at the second ends of inner ribs (9) and wraps around the first member (10), FIG. 2A.

An inner white fabric or layer of interweaving threads (14) means for rough light diffusing is attached to the outer ribs (8) at the points near the second ends of inner ribs (9), FIG. 2.

A bayonet locker or fastening mechanism, comprising a first member (10) and a second member (27), wherein said members are means for interlocking. The second member (27) comprises L-slots (24) which match extruded pins (25) of the first member (10) to keep said members interlocked. An inner thread (29) is optional and intended for attaching of an extension handle (not shown), FIG. 5.

Another variation of the second member of the fastening mechanism can be an umbrella type locker which should be implemented onto the second member. In this case the L-slots are not required for the second member, and the first member of the fastening mechanism, instead of pins, may have an open slot which matches with the locker, means for interlocking of said members.

A pyramidal shaped supportive frame comprises supportive ribs (13) and the base ring (5), wherein the supportive ribs (13) disposed between slots (11) and rigidly connected by bolts (15), FIG. 2A. The shown supportive ribs are bent by twos in triangular shapes. However each supportive rib may be bent separately and screwed into the base ring by a thread or may be rigidly connected with the base ring by another suitable method.

Figure 4:
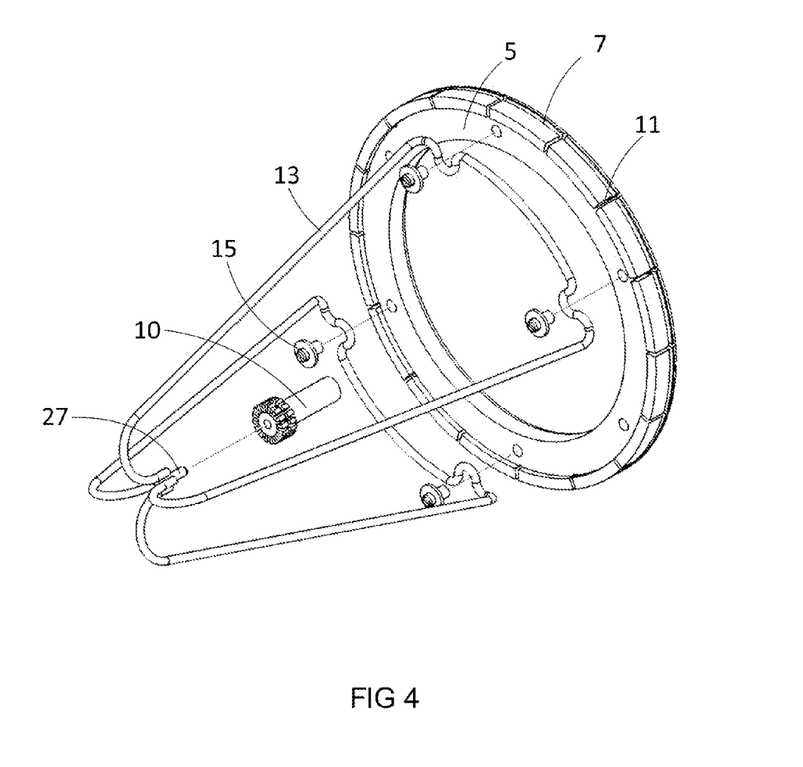
FIG. 4 illustrates a close view of the pyramidal shaped supportive frame with rigidly attached a second member of a bayonet locker, the base ring and a first member of the bayonet locker.

At a vertex of the pyramidal shaped supportive frame the end of each supportive rib (13) is roundly bent inward of the pyramidal shaped supportive frame, FIG. 4. Under the vertex of the pyramidal shaped supportive frame, the second member (27) is rigidly connected with the bent ends of each supportive rib (13), FIG. 4.

Figure 4A:
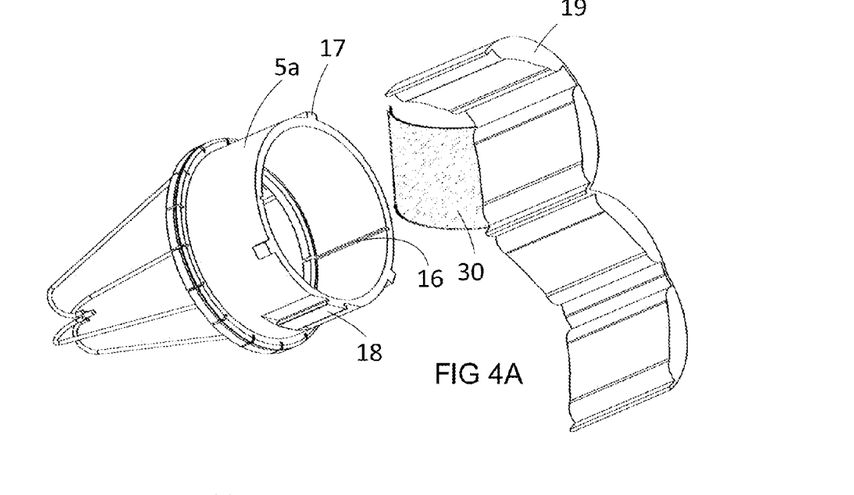
FIG. 4A illustrates a close view of a second variation of the base ring, soft pads in open stage with light diffusor.
Figures 4B, 4C:
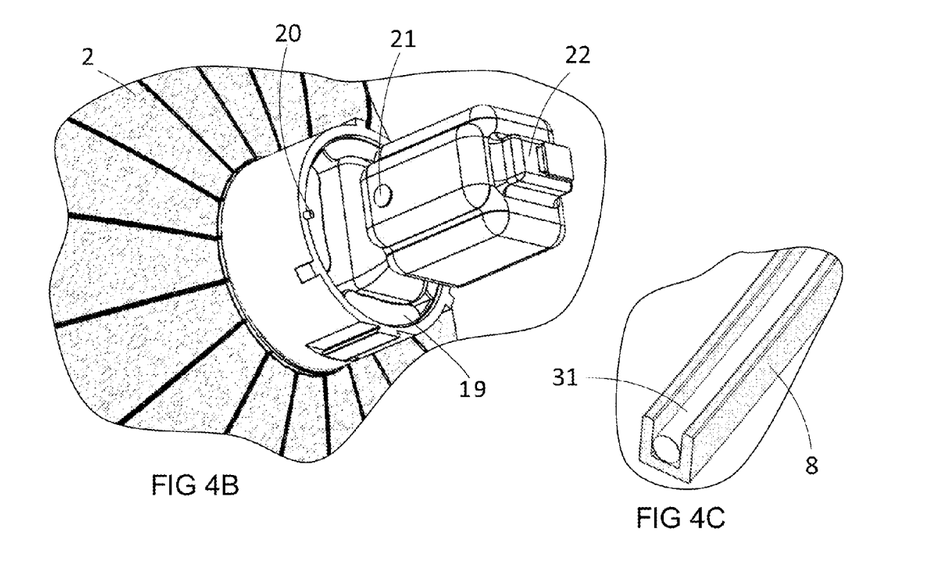
FIG. 4B illustrates a method of mounting a camera flash.
FIG. 4C illustrates a partial view of an optical fiber and an outer rib.

Another variation of the base ring (5a) is intended to fit various light sources. The base ring (5a) comprises a T-shaped mounting portion (18) means for attaching to a holder, or a light stand, or a handle, FIG. 4A. Bayonet mounting portions (17) are disposed around the base ring (5a) and are intended for attaching a light source. Foldable soft pads (19) with a light diffusor (30) are inserted into the base ring (5a), and are intended to hold a camera flash (22), FIGS. 4A, 4B.

In some lighting scenarios when optical signal is used for triggering camera flash or another light source, and a triggering light is invisible for optical sensor of the light source, an optical fiber is a solution to conduct the triggering light in such situations. Each optical fiber (31) has two open ends and is disposed along the outer rib (8) and one of groves (16), FIGS. 4C, 4A. For mentioned purpose, a first end of the optical fiber is disposed at the front edge of the light modifier, and a second end (20) of the optical fiber is disposed at the back of the base ring, FIG. 4B. The camera flash is inserted between the soft pads (19), wherein a camera flash sensor (21) is closely disposed to the second end (20) of the optical fiber means for increasing the amount of triggering light picked up by the camera flash sensor (21), FIG. 4B.

To open the light modifier move the first member (10), with pivotably attached second ends of inner ribs (9), toward the second member (27). Herewith said inner ribs (9) move forward between supportive ribs (13) of pyramidal shaped supportive frame, deploying the structure, and shaping the light modifier to its operational stage; whereby providing a stretching of the sectional material (2) and bending of the outer ribs (8). Once the extruded pins (25) reach the bottom of the L-slots (24), turn the first member (10) to guide the extruded pins (25) across the bottom of the L-slots (24), means for interlocking both bayonet members. Whereby said backlash connections of both ends of inner ribs (9) are intended to provide turning the first member (10). Then the spring pressure of bent outer ribs (8) through the inner ribs (9) prevents the first member (10) from backing out.

Figure 6:
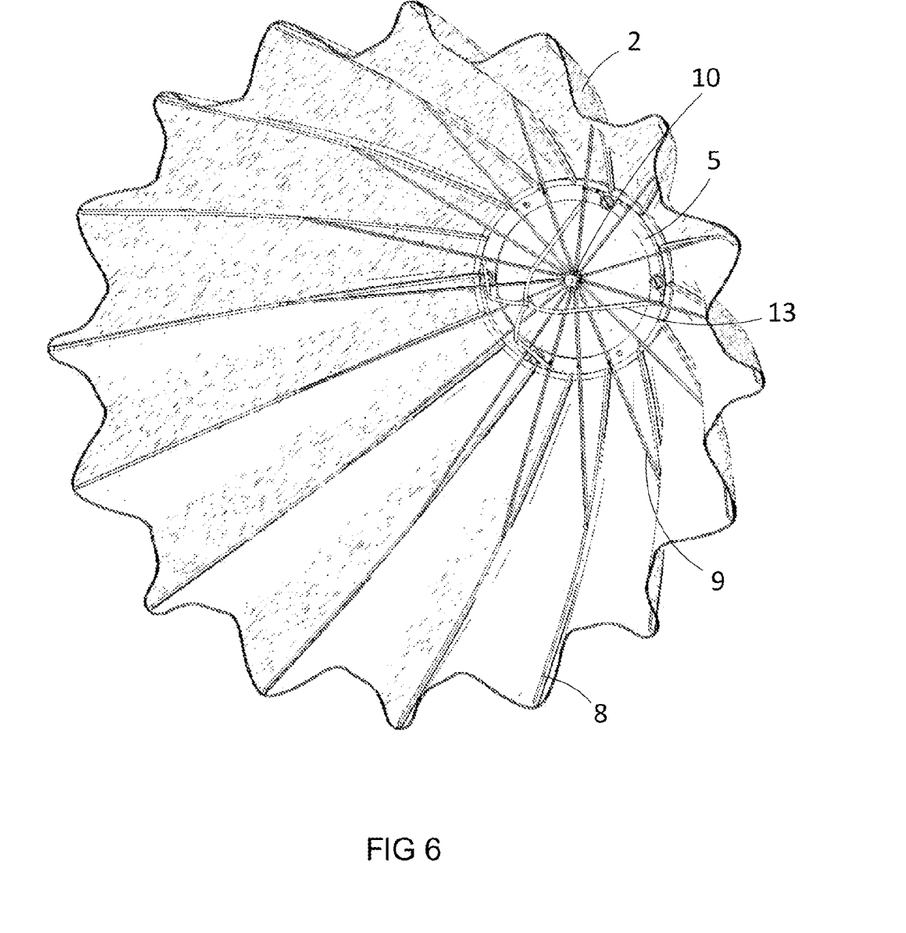
FIG. 6 illustrates an inner view of the assemble-free fast deployable light modifier in a semi-collapsed stage; layers of interweaving threads are not shown.

To collapse the light modifier, turn back the first member (10) and move toward the base ring (5). Herewith said inner ribs (9) move backward between supportive ribs (13) of pyramidal shaped supportive frame, collapsing the structure, FIGS. 6, 7 (shown semi-collapsed stage), and shaping the light modifier to its storage or transportable stage.

Following the described above, I claim:

1. An assemble-free fast deployable light modifier, comprising:
   a. a fastening mechanism, comprising a first member and a second member, wherein said members are means for interlocking;
   b. a supportive frame having a vertex and comprising plurality of supportive ribs and a base ring, said supportive ribs are rigidly connected with said base ring, said second member of said fastening mechanism disposed under said vertex and rigidly connected with said supportive frame;
   c. plurality of disposed by circumference outer ribs, said outer ribs have a first end and a second end, said first end hingedly connected with said base ring;
   d. plurality of inner ribs, said inner ribs have a first end and a second end, said first end pivotably connected to said first member of said fastening mechanism, said second end of said inner ribs pivotably connected to said outer ribs between the ends of said outer ribs;
   e. sectional material, comprising a bright colored side means for light reflecting, and a dark colored side means for light absorbing, said sectional material means for wrapping over said outer ribs;
   f. at least one layer of interweaving threads means for light diffusing;
   g. at least one optical fiber means for triggering light conducting;
   h. at least one soft pad comprising a light diffusor means for holding a light source and rough light diffusing.

2. The assemble-free fast deployable light modifier of claim 1, wherein said first member of said fastening mechanism having at least one pin and comprising a gutter and plurality of slots disposed around, said first member.

3. The assemble-free fast deployable light modifier of claim 1, wherein said second member of said fastening mechanism disposed inside of said supportive frame under said vertex and rigidly connected with said supportive frame.

4. The assemble-free fast deployable light modifier of claim 1, wherein said supportive frame having supportive ribs means for forming a pyramidal shape, said supportive ribs are bent inward at said vertex of said frame.

5. The assemble-free fast deployable light modifier of claim 1, wherein said sectional material, comprising a front edge and a back edge, wherein said second end of said outer ribs spaced with predetermined distance and attached to said front edge, said back edge disposed around said base ring.

6. The assemble-free fast deployable light modifier of claim 1, wherein said base ring comprising at least one mounting portion means for attaching to a holder.

7. The assemble-free fast deployable light modifier of claim 1, wherein said base ring comprising plurality of bayonet mounting portions means for attaching to a light source.

8. A method of operating an assemble-free fast deployable light modifier, comprising:
  a. providing a structure of pivotably interconnected outer and inner ribs means for collapsing, stretched over by a sectional material and having at least one layer of interweaving threads, means for light diffusing, said structure comprising:
    i. a fastening mechanism means for fastening, comprising a first member and a second member, wherein said members are means for interlocking, wherein said first member pivotably connected to said inner ribs;
    ii. a supportive frame having a vertex and comprising supportive ribs and a base ring, said supportive ribs are rigidly connected with said base ring, said second member of said fastening mechanism disposed under said vertex and rigidly connected with said supportive frame;
  b. operation of opening comprising:
    i. moving said first member of said fastening mechanism through said supportive frame towards said second member of said fastening mechanism in direction from said base ring to said vertex of said supportive frame;
    ii. locking said first member with said second member of said fastening mechanism means for stabilizing said light modifier in operational state;
  c. operation of collapsing comprising:
    i. unlocking said first member and said second member of said fastening mechanism;
    ii. moving said first member of said fastening mechanism through said supportive frame in direction from said vertex of said supportive frame to said base ring.

9. The method of claim 8, wherein moving said first member of said fastening mechanism through said supportive frame, thereby moving a plurality of said inner ribs between said supportive ribs.

* * * * *